US012747368B2

(12) United States Patent
Saito et al.

(10) Patent No.: US 12,747,368 B2
(45) Date of Patent: Sep. 29, 2026

(54) MOISTURE ABSORPTION FILM LAYERED PRODUCT AND MANUFACTURING METHOD THEREFOR

(71) Applicants: NIPPON STEEL CHEMICAL & MATERIAL CO., LTD., Tokyo (JP); Mazda Motor Corporation, Aki-gun (JP)

(72) Inventors: Takashi Saito, Tokyo (JP); Tetsuya Maeda, Aki-gun (JP); Hiroto Matsui, Aki-gun (JP); Mitsuyoshi Kawabe, Aki-gun (JP); Daiji Katsura, Aki-gun (JP)

(73) Assignees: NIPPON STEEL Chemical & Material Co., Ltd., Tokyo (JP); Mazda Motor Corporation, Aki-gun (JP)

( * ) Notice: Subject to any disclaimer, the term of this patent is extended or adjusted under 35 U.S.C. 154(b) by 169 days.

(21) Appl. No.: 18/890,957

(22) Filed: Sep. 20, 2024

(65) Prior Publication Data

US 2025/0109314 A1 Apr. 3, 2025

(30) Foreign Application Priority Data

Sep. 29, 2023 (JP) ................................ 2023-169835

(51) Int. Cl.
*C09D 133/08* (2006.01)
*C09D 133/12* (2006.01)

(52) U.S. Cl.
CPC ......... *C09D 133/08* (2013.01); *C09D 133/12* (2013.01)

(58) Field of Classification Search
CPC ...... C09D 133/08; C09D 133/12; C09D 4/06; C09D 4/00; C08F 220/20; C08F 2/48; C08F 222/1006
See application file for complete search history.

(56) References Cited

U.S. PATENT DOCUMENTS

| | | | | |
|---|---|---|---|---|
| 2002/0037402 | A1 | 3/2002 | Yamazaki et al. | |
| 2002/0176983 | A1 | 11/2002 | Yamazaki et al. | |
| 2009/0191373 | A1 * | 7/2009 | Okazaki | C08J 7/046 428/480 |
| 2010/0028694 | A1 * | 2/2010 | Zhang | C08G 18/672 977/773 |
| 2013/0052431 | A1 * | 2/2013 | Enomoto | C09D 133/16 522/39 |
| 2013/0302599 | A1 | 11/2013 | Oya et al. | |

FOREIGN PATENT DOCUMENTS

| | | | |
|---|---|---|---|
| JP | 2001146585 | A | 5/2001 |
| JP | 2012117025 | A | 6/2012 |
| JP | 2016169288 | A | 9/2016 |
| JP | 2019094468 | A | 6/2019 |

* cited by examiner

*Primary Examiner* — Blaine Copenheaver
(74) *Attorney, Agent, or Firm* — Troutman Pepper Locke LLP

(57) ABSTRACT

Provided is a moisture absorption film layered product that can be photocured by using ultraviolet ray, which can achieve curing in a short time, and that has both excellent defogging properties and abrasion resistance. A moisture absorption film layered product including a moisture absorption film formed on a surface of a substrate, wherein the moisture absorption film is formed by curing a photocurable resin composition containing a siloxane resin (A) having a (meth)acryloyl group, three particular (meth)acrylate monomers (B), (C), and (D), and a photo-initiator as essential components, a blending proportion of (A):(B):(C):(D) is 0.1 to 5:35 to 55:0.5 to 10:40 to 60, (B) is a bifunctional monomer having a hydroxy group, (C) is a monofunctional monomer having an ethylene glycol chain, and (D) is a monofunctional monomer having a hydroxy group.

5 Claims, No Drawings

MOISTURE ABSORPTION FILM LAYERED PRODUCT AND MANUFACTURING METHOD THEREFOR

BACKGROUND OF THE INVENTION

Field of the Invention

The present invention relates to a moisture absorption film layered product, and relates to a layered product having: a substrate; and a cured coating of an active energy ray curable composition on an at least partial surface of the substrate, the cured coating having excellent adhesiveness to the substrate and being able to impart excellent properties of scratch resistance and moisture absorbency.

Description of the Related Art

In recent years, defogging technology of not causing dew condensation on a member such as a window has been required in vehicles such as automobiles, trucks, buses, and electric trains from the viewpoint of energy saving. In the defogging technology, a moisture absorption film is formed on the member such as a window to absorb moisture to be dew condensation in the moisture absorption film, and consequently exhibit the defogging function.

As such a moisture absorption film, proposed are, for example, a paint composition composed of a (meth)acrylic resin, a polyol compound, and a multifunctional isocyanate compound (Patent Literature 1), a composition containing a polyvinyl acetal resin (Patent Literature 2 and 3), and a composition composed of a copolymer, a multifunctional block isocyanate compound, and a surfactant (Patent Literature 4).

CITATION LIST

Patent Literature 1: JP2019-94468 A
Patent Literature 2: JP2012-117025 A
Patent Literature 3: JP2001-146585 A
Patent Literature 4: JP2016-169288 A

SUMMARY OF THE INVENTION

All the literature in Citation List are, however, thermal curing, and require high temperature and time for curing. Thus, the productivity is poor, and abrasion resistance is insufficient. Although there is a method of adding a filler in order to improve the abrasion resistance, water absorbency deteriorates.

In view of the above circumstances, an object of the present invention is to provide a moisture absorption film layered product that can be photocured by using ultraviolet ray, which can achieve curing in a short time compared with thermal curing, and that has both excellent defogging properties and abrasion resistance.

The present inventors have made intensive investigation to achieve the above object, and consequently found that the above problem can be solved by the following means differing from the literature in Citation List. This finding has led to completion of the present invention.

Specifically, the present invention is a moisture absorption film layered product comprising: a substrate; and a moisture absorption film formed on an at least partial surface of the substrate, wherein the moisture absorption film is formed by curing a photocurable resin composition comprising a siloxane resin (A) having a (meth)acryloyl group, the following three (meth)acrylate monomers (B), (C), and (D), and a photo-initiator as essential components, a blending proportion of (A):(B):(C):(D) being 0.1 to 5:35 to 55:0.5 to 10:40 to 60 by weight ratio, the siloxane resin (A) is represented by the general formula (1), and contains a polyorganosilsesquioxane having a cage-shaped structure in a structural unit as a main component, $$[RSiO_{3/2}]_n \quad (1)$$

wherein R represents an organic functional group having a (meth)acryloyl group, and n represents 8, 10, or 12, the (meth)acrylate monomer (B) is a bifunctional monomer represented by the general formula (2), (2)

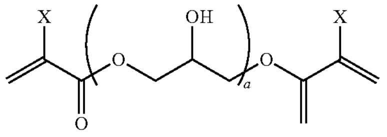

wherein X represents H or a methyl group, and a=1 to 5, the (meth)acrylate monomer (C) is a monofunctional monomer represented by the general formula (3), (3)

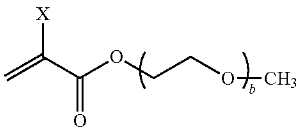

wherein X represents H or a methyl group, and b=4 to 15, the (meth)acrylate monomer (D) is a monofunctional monomer represented by the general formula (4), (4)

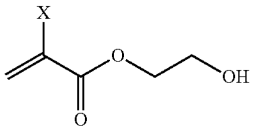

wherein X represents H or a methyl group, the moisture absorption film has a water absorption rate of 10 w % or more and 30 w % or less, and the moisture absorption film has a haze changing value ΔH before and after a Taber abrasion test of 4 or less.

The present invention can provide the defogging layered product having the moisture absorption film having both the excellent moisture absorbency and abrasion resistance.

DETAILED DESCRIPTION OF THE INVENTION

Hereinafter, each element constituting the present invention will be described in detail, but the present invention is not limited to the description unless departing from its sprit. When the expression "(meth)acrylate" is used herein, the expression means either or both of "acrylate" and "methacrylate". The expressions "(meth)acrylate" and "(meth) acryloyl" are same as above.

[Layered Product]

The moisture absorption film layered product of the present invention has a substrate and a moisture absorption film formed on an at least partial surface of the substrate. The moisture absorption film may be formed on a partial surface of the substrate, on an entire surface of the substrate, or on both entire surfaces of the substrate.

The substrate is not particularly limited as long as the moisture absorption film can be formed, and may be constituted with, for example, an inorganic material, an organic material, or a composite material of an inorganic material and an organic material. Among these, glass, which is poor at moisture absorbency, is preferable, and example thereof include silicate salt glass (silicate glass, silicate alkali glass, lead alkali glass, soda-lime glass, potassium-lime glass, and barium glass), borosilicate glass, and phosphonate glass, and further include plate glass composed of these glasses (for example, general plate glass (common plate glass, figured glass, polished plate glass, and float glass), composite glass, laminated glass, and reinforced glass). These may be colorless or colored, and particularly preferably a curved surface laminated glass used for a window for a vehicle.

The siloxane resin (A) having a (meth)acryloyl group is represented by the general formula (1), and contains a polyorganosilsesquioxane having a cage-shaped structure in a structural unit (also referred to as a cage-shaped polyorganosilsesquioxane; the polyorganosilsesquioxane is also referred to as silsesquioxane) as a main component.

In the general formula (1), R represents an organic functional group having a (meth)acryloyl group, and n represents 8, 10, or 12. Examples of the organic functional group R having a (meth)acryloyl group include groups represented by the following general formula (1a). In the formula (1a), m represents an integer of 1 to 3, and R1 represents a hydrogen atom or a methyl group.

$$CH_2{=}CR^1{-}COO{-}(CH_2)_m{-} \quad (1a)$$

In the silicone resin (A), the organic functional group R having a (meth)acryloyl group is bonded to a silicon atom in the molecule.

Examples of specific structures of the cage-shaped polyorganosilsesquioxane in which n in the general formula (1) represents 8, 10, or 12 respectively include a cage-shaped structure represented by the following structural formulae (5), (6), and (7). In the following formulae, R represents the same as R in the general formula (1).

(5)

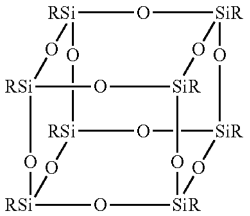

-continued (6)

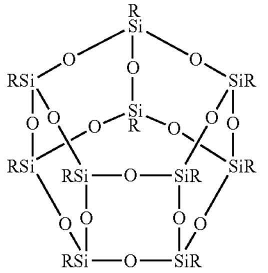

(7)

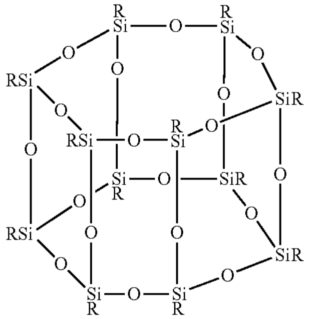

The siloxane resin (A) can be manufactured by a method described in JP2004-143449 A, etc. For example, the siloxane resin (A) can be obtained by a hydrolysis reaction and partial condensation of a silicon compound represented by $RSiX_3$ in the presence of a polar solvent and a basic catalyst, and further re-condensation of the obtained hydrolysis product in the presence of a nonpolar solvent and a basic catalyst.

Here, in the silicon compound $RSiX_3$ used as the raw material, R represents an organic functional group having a (meth)acryloyl group, specifically the group represented by the general formula (1a), and X3 represents a hydrolysable group.

Specific examples of the preferable R include a 3-methacryloxypropyl group, a methacryloxymethyl group, and a 3-acryloxypropyl group.

The hydrolysable group X3 is not particularly limited as long as the group has a hydrolysable property. Examples thereof include an alkoxyl group and an acetoxy group, and the hydrolysable group is preferably an alkoxyl group. Examples of the alkoxyl group include a methoxy group, an ethoxy group, an n- or i-propoxy group, or an n-, i-, or t-butoxy group. The methoxy group is preferable because of its high reactivity.

Examples of a preferable compound in the silicon compound represented by $RSiX_3$ include methacryloxymethyltriethoxysilane, methacryloxymethyltrimethoxysilane, 3-methacryloxypropyltrichlorosilane, 3-methacryloxypropyltrimethoxysilane, 3-methacryloxypropyltriethoxysilane, 3-acryloxypropyltrimethoxysilane, and 3-acryloxypropyltrichlorosilane. Among these, 3-methacryloxypropyltrimethoxysilane with easy availability of the raw material is preferably used.

Examples of the basic catalyst used in the hydrolysis reaction include: alkali metal hydroxides such as potassium hydroxide, sodium hydroxide, and cesium hydroxide; or ammonium hydroxide salts such as tetramethylammonium hydroxide, tetraethylammonium hydroxide, tetrabutylammonium hydroxide, benzyltrimethylammonium hydroxide, and benzyltriethylammonium hydroxide. Among these, tetramethylammonium hydroxide is preferably used in terms of its high catalytic activity. The basic catalyst is typically used as an aqueous solution.

As the hydrolysis reaction condition, the reaction temperature is preferably 0 to 60° C., and more preferably 20 to 40° C. If the reaction temperature is lower than 0° C., the reaction rate becomes lower and hydrolysable groups remain in an unreacted state, thereby consuming a long reaction time. On the other hand, if the reaction temperature is higher than 60° C., the reaction rate is excessively high to proceed complex condensation reactions to consequently accelerate increase in the molecular weight of the hydrolysis product. The reaction time is preferably 2 hours or longer. If the reaction time is shorter than 2 hours, the hydrolysis reaction may not sufficiently proceed and hydrolysable groups may be left in an unreacted state.

The hydrolysis reaction essentially requires the presence of water. This water may be supplied from the aqueous solution of the basic catalyst, or may be added as additional water. An amount of water is preferably more than or equal to an amount sufficient for the hydrolyzing the hydrolysable group, and preferably 1.0 to 1.5 times larger than the theoretical amount. In the hydrolysis, the organic polar solvent needs to be used, and as the organic polar solvent, alcohols such as methanol, ethanol, and 2-propanol, or other organic polar solvents can be used. The polar organic solvent is preferably lower alcohols having 1 to 6 carbon atoms and solubility with water, and 2-propanol is more preferably used. Use of a nonpolar solvent is unpreferable because the reaction system becomes heterogeneous and the hydrolysis reaction does not sufficiently proceed, thereby leaving the unreacted hydrolysable groups.

After the hydrolysis reaction is finished, water or the water-containing reaction solvent is separated. For separating water or the water-containing reaction solvent, means such as evaporation under a reduced pressure can be adopted. To sufficiently remove moisture and other impurities, means such as adding a nonpolar solvent to dissolve the hydrolysis reaction product, washing this solution with a saline solution, etc., and then drying the solution with a desiccant such as anhydrous magnesium sulfate can be adopted. Although the hydrolysis reaction product can be recovered by separating the nonpolar solvent by means such as evaporation, the nonpolar solvent is not necessarily separated when the nonpolar solvent can be used as a nonpolar solvent used in the next reaction.

In the hydrolysis reaction, a condensation reaction of the hydrolysate occurs together with the hydrolysis. The hydrolysis product involving the condensation reaction of the hydrolysate typically forms a colorless viscous liquid having a number-average molecular weight of 1400 to 5000. Although varying depending on the reaction condition, the hydrolysis product is preferably an oligomer having a number-average molecular weight of 1400 to 3000, most of, preferably almost all of, the hydrolysable groups X are substituted with OH groups, and further, most of, preferably 95% or more of, the OH groups are condensed. The structure of the hydrolysis product includes silsesquioxane composed of a plurality of cage shapes, ladder shape, and random shape. As for the compound having the cage-shaped structure, a proportion of the complete cage-shaped structure is low, and the structure is mainly an incomplete cage-shaped structure with opening of a part of the cage. Therefore, the hydrolysis product obtained in this hydrolysis is further heated in the presence of the basic catalyst in the organic solvent for condensing the siloxane bonds (referred to as re-condensation) to selectively manufacture the silsesquioxane having the cage-shaped structure.

Specific procedure is as follows. After the hydrolysis reaction is finished, water or the water-containing reaction solvent is separated as noted above, the re-condensation reaction is performed in the presence of the nonpolar solvent and the basic catalyst. The reaction condition for the re-condensation reaction is a reaction temperature of preferably within a range of 100 to 200° C., and more preferably 110 to 140° C. If the reaction temperature is excessively low, sufficient driving force for the re-condensation reaction cannot be obtained to fail to proceed the reaction. If the reaction temperature is excessively high, the (meth)acryloyl group may cause a self-polymerization reaction, and thereby it is required to lower the reaction temperature or to add a polymerization inhibitor, etc. The reaction time is preferably 2 to 12 hours. An amount of the nonpolar solvent used is preferably an amount sufficient for dissolving the hydrolysis reaction product. An amount of the basic catalyst used is preferably within a range of 0.1 to 10 wt % relative to the hydrolysis reaction product.

The nonpolar solvent has no or almost no solubility with water, and is preferably a hydrocarbon solvent. Examples such a hydrocarbon solvent include nonpolar solvents having a low boiling point such as toluene, benzene, and xylene. Among these, toluene is preferably used. As the basic catalyst, the basic catalyst used in the above hydrolysis reaction can be used. Examples thereof include: alkali metal hydroxides such as potassium hydroxide, sodium hydroxide, and cesium hydroxide; or ammonium hydroxide salts such as tetramethylammonium hydroxide, tetraethylammonium hydroxide, tetrabutylammonium hydroxide, benzyltrimethylammonium hydroxide, and benzyltriethylammonium hydroxide, and a catalyst soluble in the nonpolar solvent such as a tetraalkylammonium is preferable.

The hydrolysis product used for the re-condensation is preferably washed with water, dehydrated, and concentrated before use, but may not be washed with water and dehydrated before use. In this reaction, water may be present but not necessarily added purposely, and water brought from the basic catalyst solution is useful sufficiently. If the hydrolysis of the hydrolysis product is not sufficiently performed, water at an amount larger than the theoretical amount for hydrolyzing the remained hydrolysable group is needed, but in typical, the hydrolysis reaction is sufficiently performed. After the re-condensation reaction, the product is washed with water to remove the catalyst, and concentrated to obtain a cage-shaped silsesquioxane mixture in which a number of silicon atoms and a number of (meth)acryloyl groups are equal in the molecule.

In the silsesquioxane mixture obtained as above, although varying depending on the reaction condition and a state of the hydrolysis product, the constituents thereof are considered to be a plurality of types of the cage-shaped silsesquioxane accounting for 70 wt % or more of the entirety, and ladder-shaped and randomly crosslinked types of silsesquioxane as the remainder. It is difficult to separate these products due to heavy load, and thereby the silsesquioxane containing the cage-shaped silsesquioxane represented by the general formula (1) at 70 wt % or more is preferably referred to as the siloxane resin (A) having a (meth)acryloyl group in the present invention. As for the plurality of types as constituents of the cage-shaped silsesquioxane, T8 represented by the general formula (5) is at preferably 10 to 40 wt %, T10 represented by the general formula (6) is at preferably 30 to 50 wt %, T12 represented by the general formula (7) is at preferably 5 to 20 wt %, and other components may be contained at 50 wt % or less. T8 can be precipitated and separated as a needle crystal by leaving the silsesquioxane mixture at 20° C. or lower. The content proportion of the cage-shaped silsesquioxane can be determined by using GPC, LC-MS, etc., for example.

The photocurable resin composition of the present invention can be obtained by mixing the siloxane resin (A) having a (meth)acryloyl group and the (meth)acrylate monomers (B), (C), and (D) at a weight ratio of (A):(B):(C):(D)=0.1 to 5:35 to 55:0.5 to 10:40 to 60, and adding a photo-initiator. In terms of a balance between the water absorption rate and an abrasion property, a more preferable blending proportion is (A):(B):(C):(D)=1 to 5:40 to 45:3 to 8:45 to 55.

The siloxane resin (A) having a (meth)acryloyl group used in the present invention may be a mixture of the cage-shaped polyorganosilsesquioxanes T8, T10, and T12, and may be a product in which one or two thereof such as T8 are separated or concentrated from the mixture.

The siloxane resin (A) having a (meth)acryloyl group used in the present invention is not limited to the silicone resin obtained by the above manufacturing method.

The siloxane resin (A) is a multifunctional (meth)acrylate compound having (meth)acryloyl groups at a number same as n, and blending the siloxane resin (A) at the predetermined ratio is expected to proceed three-dimensional crosslinking reaction to improve abrasion resistance of the moisture absorption film. The blending proportion is preferably 0.1 to 5 parts by weight relative to the photocurable resin composition. A blending proportion of less than 0.1 part by mass causes insufficient abrasion resistance, and a blending proportion of more than 5 parts by mass causes the moisture absorption film to be a hard and fragile film. In addition, curing contraction becomes large to cause cracking in curing, and such a hardened moisture absorption film hardly causes expansion with moisture absorption, which may lead to deterioration of the water absorption property. From the viewpoint of improvement of the abrasion resistance, the blending proportion is more preferably 1 to 5 parts by mass.

The (meth)acrylate monomer (B) used in the present invention is specifically glycerol 1,3-diglycerolate diacrylate or glycerol 1,3-diglycerolate dimethacrylate, which is an acrylic acid or methacrylic acid adduct of a reaction product of glycerol and epichlorohydrin. Since having three hydroxy groups and two (meth)acrylate groups in one molecule, the (meth)acrylate monomer (B) has high hydrophilicity and is expected to increase the water absorption rate of the moisture absorption film and to impart the abrasion resistance with construction of an appropriate crosslinking structure. The blending proportion is preferably 35 to 55 parts by weight relative to the photocurable resin composition. A blending proportion of less than 35 parts by weight causes insufficient water absorption properties and abrasion properties, and a blending proportion of more than 55 parts by weight may cause the moisture absorption film to be hard and fragile. A more preferable range of the blending proportion is 40 to 50 parts by weight.

The (meth)acrylate monomer (C) used in the present invention is specifically methoxy polyethylene glycol acrylate or methoxy polyethylene glycol methacrylate. In the (meth)acrylate monomer (C), b=4 to 15, and more preferably 6 to 13 in terms of a balance between the water absorption rate and an abrasion property. Since being a monofunctional and having a plurality of ether bonds in one molecule, the (meth)acrylate monomer (C) can be expected to impart the moisture absorption property and approximate flexibility to the moisture absorption film. The blending proportion is preferably 0.5 to 10 parts by weight relative to the photocurable resin composition. A blending proportion of less than 0.5 parts by mass causes insufficient water absorption properties, and a blending proportion of more than 10 parts by weight causes excessive softness and insufficient abrasion resistance. A more preferable blending proportion is 1 to 8 parts by weight.

The (meth)acrylate monomer (D) used in the present invention is specifically 2-hydroxyethyl methacrylate or 2-hydroxyethyl acrylate. Since being a monofunctional and having one hydroxy group in one molecule, the (meth) acrylate monomer (D) can be expected to improve the moisture absorption property of the moisture absorption film. The blending proportion is preferably 40 to 60 parts by weight relative to the photocurable resin composition. A blending proportion of less than 40 parts by mass causes insufficient water absorption properties. A blending proportion of more than 60 parts by weight causes insufficient three-dimensional crosslinking in the moisture absorption film, and may cause a soft film and insufficient abrasion resistance. A more preferable blending proportion is 45 to 55 parts by weight.

In the photocurable resin composition of the present invention, an amount of the photo-initiator added is preferably within a range of 0.01 to 10 parts by weight relative to 100 parts by weight of the total of the resin composition (resin component excluding water and a solvent). If the addition amount is less than this range, crosslinking becomes insufficient to decrease an elastic modulus, which fails to obtain a desired surface hardness. In contrast, containing at an amount exceeding this range cannot be expected to further increase the reaction ratio. The amount is more preferably within a range of 5 to 10 parts by weight.

The photopolymerization initiator is not particularly limited, and common photopolymerization initiators can be widely applied. Acetophenone compounds, benzoyl compounds, benzophenone compounds, thioxanthone compounds, acylphosphine oxide compounds, etc. can be suitably used. Specific examples thereof include trichloroacetophenone, diethoxyacetophenone, 1-phenyl-2-hydroxy-2-methylpropan-1-one, 1-hydroxycyclohexyl phenyl ketone, 2-methyl-1-(4-methylthiophenyl)-2-morpholinopropan-1-one, benzoin methyl ether, benzil dimethyl ketal, benzophenone, 4,4'-bis(diethylamino)benzophenone, methyl benzophenone-2-carboxylate, 4-benzoyl-4'-methyldiphenyl sulfide, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2-methyl-1-[4-(methylthio)phenyl]-2-morpholinopropan-1-one, thioxanthone, 2,4,6-trimethylbenzoyldiphenylphosphine oxide, methyl phenyl glyoxylate, camphor quinone, benzil, anthraquinone, and Michler's ketone. In addition, a photo-initiation auxiliary or a sensitizer, which are combined with the photopolymerization initiator to exhibit the effect, may be used in combination.

The photocurable resin composition may be diluted with a solvent for purposes of regulating a solid-content concentration, improving dispersion stability, improving coatability, improving adhesiveness to the substrate, etc.

Examples of the solvent include organic solvents. Examples of the organic solvent include alcohols, ketones, ethers, esters, cellosolves, and aromatic compounds. Specific examples thereof include methanol, ethanol, 1-propanol, 2-propanol, 1-butanol, 2-butanol, isobutyl alcohol, t-butyl alcohol, benzyl alcohol, 2-methoxyethanol, 2-ethoxyethanol, 2-(methoxymethoxy)ethanol, 2-butoxyethanol, furfuryl alcohol, tetrahydrofurfuryl alcohol, diethylene glycol, diethylene glycol monomethyl ether, diethylene glycol monoethyl ether, diethylene glycol monobutyl ether, 1-methoxy-2-propanol, 1-ethoxy-2-propanol, dipropylene glycol, dipropylene glycol monomethyl ether, dipropylene glycol monoethyl ether, tripropylene glycol monomethyl ether, diacetone alcohol, acetone, methyl ethyl ketone, 2-pentanone, 3-pentanone, 2-hexanone, methyl isobutyl ketone, 2-heptanone, 4-heptanone, diisobutyl ketone, cyclohexanone, methylcyclohexanone, acetophenone, diethyl ether, dipropyl ether, diisopropyl ether, dibutyl ether, dihexyl ether, anisole, phenetole, tetrahydrofuran, tetrahydropyran, 1,2-dimethoxyethane, 1,2-diethoxyethane, 1,2-dibutoxyethane, diethylene glycol dimethyl ether, diethylene glycol diethyl ether, diethylene glycol dibutyl ether, glycerol ether, methyl acetate, ethyl acetate, propyl acetate, isopropyl acetate, butyl acetate, isobutyl acetate, sec-butyl acetate, pentyl acetate, isopentyl acetate, 3-methoxybutyl acetate, 2-ethylbutyl acetate, 2-ethylhexyl acetate, methyl propionate, ethyl propionate, butyl propionate, γ-butyrolactone, 2-methoxyethyl acetate, 2-ethoxyethyl acetate, 2-butoxyethyl acetate, 2-phenoxyethyl acetate, diethylene glycol monoethyl ether acetate, diethylene glycol monobutyl ether acetate, benzene, toluene, and xylene. These organic solvents can be used singly, or in combination of two or more thereof.

In the moisture absorption film of the present invention, an ultraviolet ray absorbent or a light stabilizer (ultraviolet ray stabilizer) can be added for a purpose of improving weather resistance.

As the ultraviolet ray absorbent, inorganic materials such as inorganic oxide fine particles such as titanium oxide, cerium oxide, zirconium oxide, and zinc oxide, metal chelate compounds of titanium, zinc, zirconium, etc., and a (partial) hydrolysate or condensate thereof, and organic materials can be used.

Examples of the organic materials preferably include compound derivatives having a main skeleton of hydroxybenzophenone, benzotriazole, cyanoacrylate, or triazine. Further, a polymer having these ultraviolet ray absorbents on the side chain, an ultraviolet ray absorbent having a reactive functional group, or a silylation-modified ultraviolet ray absorbent, or (partial) hydrolyzing condensate thereof may also be used. Specific examples thereof include 2-(2-hydroxy-5-t-butylphenyl)-2H-benzotriazole, 2-[5-chloro-(2H)-benzotriazol-2-yl]-4-methyl-6-(t-butyl)phenol, 2-(2H-benzotriazol-2-yl)-6-(1-methyl-1-phenylethyl)-4-(1,1,3,3-tetramethylbutyl)phenol, 2-[4-[(2-hydroxy-3-(2'-ethyl) hexyl)oxy]-2-hydroxyphenyl]-4,6-bis(2,4-dimethylphenyl)-1,3,5-triazine, (co)polymer of 2-hydroxy-4-(2-acryloxyethoxy)benzophenone, and (co)polymer of 2-(2'-hydroxy-5'-methacryloxyethylphenyl)-2H-benzotriazole. These ultraviolet ray absorbents may be used in combination of two or more thereof.

The ultraviolet ray stabilizer preferably has one or more cyclic hindered amine structures in the molecule. Specific examples thereof include bis(2,2,6,6-tetramethyl-1-(octyloxy)-4-piperidyl) ester, 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl) pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate. These ultraviolet ray stabilizers may be used in combination of two or more thereof.

In the photocurable resin composition of the present invention, various additives can be added in addition to the aforementioned components within a range of, for example, not deteriorating the function. Examples of various additives include an organic/inorganic filler, a plasticizer, a flame retardant, a thermal stabilizer, an oxidation inhibitor, a light stabilizer, an ultraviolet ray absorbent, a lubricant, an antistatic agent, a demolding agent, a foaming agent, a nucleating agent, a colorant, a crosslinking agent, a dispersion auxiliary, and a resin component.

Examples of a method of forming the moisture absorption film composed of the photocurable resin composition on the substrate include a flow casting method, a roller coating method, a bar coating method, a spray coating method, an air-knife coating method, a spin-coating method, a flow-coating method, a curtain coating method, and a dipping method. The coating film thickness is regulated by the solid-content concentration with considering a formation film thickness after the curing by drying and active energy ray irradiation.

When the solvent is used, the solvent is preferably removed by drying, etc. after the coating. The drying temperature is preferably a condition not deforming the used substrate, and the drying time is preferably 1 hour or shorter from the viewpoint of productivity.

The moisture absorption film of the present invention can be manufactured by curing the aforementioned photocurable resin composition by irradiation with active energy ray such as visible light ray, ultraviolet ray, and electron beam. Preferably, the cured formed product can be obtained by irradiation with ultraviolet ray having a wavelength of 10 to 400 nm or visible light ray having a wavelength of 400 to 700 nm. The wavelength of the used light is not particularly limited, and near ultraviolet ray having a wavelength of 200 to 400 nm is particularly suitably used. Examples of a lamp used as an ultraviolet ray generation source include a low-pressure mercury lamp (output: 0.4 to 4 W/cm), a high-pressure mercury lamp (40 to 160 W/cm), ultrahigh-pressure mercury lamp (173 to 435 W/cm), and a metal halide lamp (80 to 160 W/cm).

The method of obtaining the moisture absorption film by irradiation with active energy ray such as light irradiation may be any one of under an oxygen-blocking atmosphere or an air atmosphere, and preferably under the oxygen-blocking atmosphere. Specific examples of the method include a method of filling the irradiation space with nitrogen and a method of blocking oxygen by using a layered product film during the irradiation.

A thickness of the moisture absorption film of the present invention is preferably 1 to 100 μm, and more preferably 3 to 50 μm from the viewpoint of scratch resistance and adhesiveness. If the thickness is less than 1 μm, the water absorption amount of the moisture absorption film is low to loss the defogging performance of the window member for a vehicle in a short time. On the other hand, the thickness is more than 100 μm, the water absorption amount is large to keep the defogging performance over a long term, but visibility deteriorates due to difference in refractive index with the substrate.

The moisture absorption film layered product of the present invention obtained as above has a water absorption rate of the moisture absorption film of 10 wt % or more and 30 wt % or less, and has a haze changing value $\Delta H$ before and after a Taber abrasion test performed with a TABER abrading wheel CS-10F, a load of 500 g, and a number of rotation of 100, of 4 or less.

EXAMPLES

Hereinafter, Examples of the present invention will be described. A silicone resin (A) used in Examples was obtained by methods described in the following Synthesis Example.

Synthesis Example 1

Into a reaction vessel equipped with a stirrer, a dropping funnel, and a thermometer, 40 ml of 2-propanol (IPA) as a solvent and a 5% tetramethylammonium hydroxide aqueous solution (TMAH aqueous solution) as a basic catalyst were fed. Into the dropping funnel, 15 ml of IPA and 12.69 g of 3-methacryloxypropyltrimethoxysilane (MTMS: SZ-6300, manufactured by Dow Corning Toray Silicone, Co., Ltd.) were added, and the MTMS solution in IPA was added dropwise over 30 minutes at room temperature while the reaction vessel was stirred. After the MTMS dropwise addition, the mixture was stirred for 2 hours without heating. After the stirring for 2 hours, the solvent was removed under a reduced pressure, and the product was dissolved in 50 ml of toluene. The reaction solution was washed with saturated saline solution until neutrality, and then dehydrated with anhydrous magnesium sulfate. The anhydrous magnesium sulfate was filtered off, and the solution was concentrated to obtain 25.8 g of a hydrolysis product (silsesquioxane). This silsesquioxane was a colorless viscous liquid soluble in various organic solvents.

Then, into a reaction vessel equipped with a stirrer, a Dean-Stark apparatus, and a cooling tube, 20.65 g of the silsesquioxane obtained above, 82 ml of toluene, and 3.0 g of a 10% TMAH aqueous solution were added, and the mixture was gradually heated to distill off water. Further, the mixture was heated to 130° C. to perform a re-condensation reaction at a reflux temperature of toluene. The temperature of the reaction solution at this time was 108° C. After the toluene reflux, the mixture was stirred for 2 hours, and then the reaction was finished. The reaction solution was washed with saturated saline solution until neutrality, and then dehydrated with anhydrous magnesium sulfate. The anhydrous magnesium sulfate was filtered off, and the solution was concentrated to obtain 18.77 g of a target cage-shaped silsesquioxane (mixture). This obtained cage-shaped silsesquioxane (S1) was a colorless viscous liquid soluble in various organic solvents.

The reaction product after the re-condensation reaction was separated by liquid chromatography and then subjected to mass analysis. Detected was a molecule ion in which R in the molecular structure of the above structural formulae (5), (6), and (7) represented a methacryloyl group and an ammonium ion was added. The constitution ratio of T8:T10:T12: other was about 2:4:1:3, and the product was confirmed to be a silicone resin mainly having the cage-shaped structure. Note that T8, T10, and T12 respectively correspond to the formulae (5), (6), and (7) wherein R represents a methacryloyl group.

Example 1

Performed was mixing:

A1: the cage-shaped silicone resin obtained in Synthesis Example 1 in which all the silicon atoms had the methacryloyl group, as Component (A);

B1: an acrylic acid adduct of a reaction product of glycerol and epichlorohydrin (Epoxy Ester 80MFA, manufactured by Kyoeisha Chemical Co., Ltd.), as Component (B);

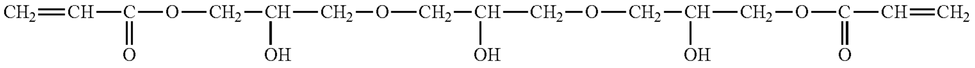

(main component)

C1: methoxy polyethylene glycol acrylate (n=13 in average, AM-130G, manufactured by SHIN-NAKAMURA CHEMICAL Co., Ltd.), as Component (C);

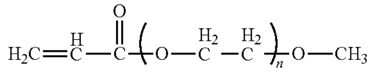

D1: 2-hydroxyethyl methacrylate, as Component (D);

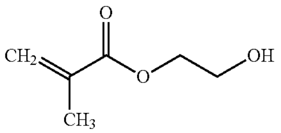

at respectively 3, 50, 2, and 45 parts by weight of A1, B1, C1, and D1;

as a photopolymerization initiator, 7.5 parts by weight of P1: 1-hydroxycyclohexyl phenyl ketone (Omnirad 184, manufactured by IGM Resins B.V.) and 0.75 parts by weight of P2: 2-methyl-1-[4-(methylthio)phenyl]-2-morpholinopropan-1-one (Omnirad 907, manufactured by IGM Resins B.V.); as a solvent, 80 parts by weight of S1: propylene glycol monomethyl ether; as an ultraviolet ray absorbent, 2.5 parts by weight of U1: 2-[5-chloro-(2H)-benzotriazol-2-yl]-4-methyl-6-(t-butyl) phenol (TINUVIN 384-2, manufactured by BASF SE); as a light stabilizer, 0.5 parts by weight of U2: bis(1, 2,2,6,6-pentamethyl-4-piperidyl) sebacate (TINUVIN 292, manufactured by BASF SE); and 0.5 parts by weight of a fluorinated surface modifier F1 to obtain a photocurable resin composition.

Then, the composition was applied on a glass plate subjected to a silane-coupling-agent treatment with a spin coater so that a film thickness after drying was 15 μm, and dried at 60° C. for 10 minutes. Thereafter, under a nitrogen atmosphere, the composition was cured by using a metal halide lamp at an integrated exposure dose of 4000 mJ/cm2 with 500 mW/cm2 to obtain a moisture absorption film layered product in which a moisture absorption film with 15 μm in thickness was formed on the glass substrate surface.

Examples 2 to 9 and Comparative Examples 1 to 8

Moisture absorption film layered products were obtained in the same manner as in Example 1 except that raw materials, blending proportion, and film thickness shown in Table 1 were used. The other abbreviated name in Table are shown below.

C2: methoxy polyethylene glycol acrylate (n=9 in average, M-90G, manufactured by SHIN-NAKAMURA CHEMICAL Co., Ltd.)

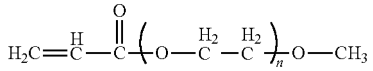

C3: methoxy tetraethylene glycol methacrylate (n=4, M-40G, manufactured by SHIN-NAKAMURA CHEMICAL Co., Ltd.)

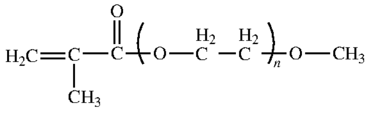

Z1: methoxy polyethylene glycol acrylate (n=23 in average, M-230G, manufactured by SHIN-NAKAMURA CHEMICAL Co., Ltd.)

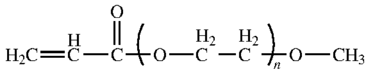

Z2: glycerol dimethacrylate (Light Ester G-101P, manufactured by Kyoeisha Chemical Co., Ltd.)

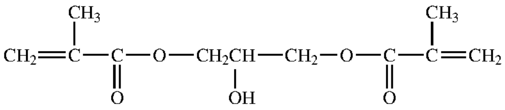

Z3: 2-hydroxypropyl methacrylate

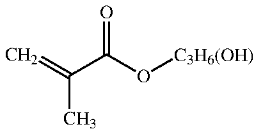

Each of various characteristics was measured and evaluated by the following method. Table 1 also show the evaluation results.

[Moisture Absorbency (Defogging Properties)]

A water absorption rate of the moisture absorption film in each of the layered products was measured by the following methods. Specifically, a weight of the glass substrate having the water absorption film (hereinafter, referred to as sample) was measured with a balance under an environment of a humidity of 20% RH, and a weight of the moisture absorption film was calculated from a weight of only the glass substrate measured in advance.

The sample was retained under a constant temperature and humidity environment of 95% RH (set temperature: 30° C.) for 1 to 2 hours, and then change in weight of the sample was measured with a balance to specify a water absorption amount of the moisture absorption film.

From the weight of the moisture absorption film and the water absorption amount of the moisture absorption film, the water absorption rate was calculated based on the following formula.

$$\text{Water absorption rate } (w\%) = (\text{Water absorption amount of moisture absorption film}/\text{Weight of moisture absorption film}) \times 100$$

A higher water absorption rate was judged as better moisture absorbency, and the moisture absorbency was evaluated based on the water absorption rate with the following criteria.

Good: Water absorption rate ≥10 w %

Poor: Water absorption rate <10 w %

[Taber Abrasion Properties (Scratch Resistance)]

A Taber abrasion test in accordance with JIS K7204 using an abrading wheel CS-10F, a load of 500 g, and a number of rotation of 100 was performed to evaluate Taber abrasion resistance from a haze value before and after the test.

$$\Delta H = (\text{Haze after Taber abrasion test}) - (\text{Haze before test})$$

A smaller ΔH (%) was judged as better abrasion resistance, and the abrasion resistance was evaluated based on the following criteria.

Good: 0<ΔH≤4

Poor: ΔH>4

[Total Evaluation]

The evaluation results of the moisture absorbency (defogging properties) and the Taber abrasion properties (scratch resistance) were totally evaluated.

Good: The evaluation results of both the moisture absorbency and the abrasion resistance were Good.

Poor: At least one of the evaluation results of the moisture absorbency and the abrasion resistance was Poor.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Component (A) | A1 | 3 | 3 | 3 | 5 | 3 | 5 | 1 | 5 | 3 |
| Component (B) | B1 | 50 | 50 | 50 | 35 | 40 | 40 | 44 | 54 | 50 |
| Component (C) | C1 | 2 | — | — | 5 | — | — | — | — | — |
| | C2 | — | 2 | — | — | 2 | 10 | — | — | — |
| | C3 | — | — | 2 | — | — | — | 5 | — | — |
| Component (D) | D1 | 45 | 45 | 45 | 55 | 55 | 45 | 50 | 40 | 45 |
| Other than above | Z1 | — | — | — | — | — | — | — | — | — |
| | Z2 | — | — | — | — | — | — | — | — | — |
| | Z3 | — | — | — | — | — | — | — | — | — |
| Photo-initiator | P1 | 7.5 | 7.5 | 7.5 | 7.5 | 7.5 | 7.5 | 7.5 | 7.5 | 7.5 |
| | P2 | 0.75 | 0.75 | 0.75 | 0.75 | 0.75 | 0.75 | 0.75 | 0.75 | 0.75 |
| Solvent | S1 | 80 | 80 | 80 | 100 | 80 | 80 | 40 | 80 | 20 |
| Ultraviolet ray absorbent | U1 | 2.5 | 2.5 | 2.5 | 2.5 | 2.5 | 2.5 | 2.5 | 2.5 | 2.5 |
| Light stabilizer | U2 | 0.5 | 0.5 | 0.5 | 0.5 | 0.5 | 0.5 | 0.5 | 0.5 | 0.5 |
| Surface modifier | F1 | 0.5 | 0.5 | 0.5 | 0.5 | 0.5 | 0.5 | 0.5 | 0.5 | 0.5 |
| Film thickness | (μm) | 15 | 15 | 15 | 5 | 15 | 15 | 30 | 15 | 50 |

TABLE 1-continued

| | | | | | | | | | | |
|---|---|---|---|---|---|---|---|---|---|---|
| Water absorption rate | (w %) | 14 | 12 | 11 | 13 | 15 | 14 | 14 | 11 | 14 |
| ΔH | (%) | 3.3 | 3 | 2.8 | 3.5 | 3.7 | 3.7 | 2.8 | 2.7 | 3.3 |
| Total evaluation | — | Good | Good | Good | Good | Good | Good | Good | Good | Good |

| | Comparative Example | | | | | | | | |
|---|---|---|---|---|---|---|---|---|---|
| | 1 | 2 | 3 | 4 | 5 | 6 | 7 | 8 | 9 |
| Component (A) | 3 | 10 | — | 5 | 3 | 1 | 5 | 3 | 3 |
| Component (B) | 50 | 50 | 50 | 30 | 40 | 33 | 35 | — | 50 |
| Component (C) | 15 | — | — | 5 | — | — | — | — | — |
| | — | 2 | — | — | — | 1 | — | 2 | 2 |
| | — | — | 5 | — | — | — | — | — | — |
| Component (D) | 32 | 38 | 45 | 60 | 57 | 65 | 55 | 45 | — |
| Other than | — | — | — | — | — | — | 5 | — | — |
| above | — | — | — | — | — | — | — | 50 | — |
| | — | — | — | — | — | — | — | — | 45 |
| Photo-initiator | 7.5 | 7.5 | 7.5 | 7.5 | 7.5 | 7.5 | 7.5 | 7.5 | 7.5 |
| | 0.75 | 0.75 | 0.75 | 0.75 | 0.75 | 0.75 | 0.75 | 0.75 | 0.75 |
| Solvent | 80 | 80 | 80 | 80 | 80 | 80 | 80 | 80 | 80 |
| Ultraviolet ray absorbent | 2.5 | 2.5 | 2.5 | 2.5 | 2.5 | 2.5 | 2.5 | 2.5 | 2.5 |
| Light stabilizer | 0.5 | 0.5 | 0.5 | 0.5 | 0.5 | 0.5 | 0.5 | 0.5 | 0.5 |
| Surface modifier | 0.5 | 0.5 | 0.5 | 0.5 | 0.5 | 0.5 | 0.5 | 0.5 | 0.5 |
| Film thickness | 15 | 15 | 15 | 15 | 15 | 15 | 15 | 15 | 15 |
| Water absorption rate | 19 | 6 | 12 | 12 | 8 | 16 | 16 | 6.8 | 9 |
| ΔH | 23 | 2.3 | 5.2 | 4.2 | 3.1 | 12.2 | 14.5 | 1.6 | 4.4 |
| Total evaluation | Poor | Poor | Poor | Poor | Poor | Poor | Poor | Poor | Poor |

The invention claimed is:

1. A moisture absorption film layered product, comprising:

a substrate; and a moisture absorption film formed on an at least partial surface of the substrate, wherein the moisture absorption film is formed by curing a photocurable resin composition comprising a siloxane resin (A) having a (meth)acryloyl group, the following three (meth)acrylate monomers (B), (C), and (D), and a photo-initiator as essential components, a blending proportion of (A):(B):(C):(D) being 0.1 to 5:35 to 55:0.5 to 10:40 to 60 by weight ratio, the siloxane resin (A) is represented by the general formula (1), and contains a polyorganosilsesquioxane having a cage-shaped structure in a structural unit as a main component, $$[RSiO_{3/2}]_n \tag{1}$$

wherein R represents an organic functional group having a (meth)acryloyl group, and n represents 8, 10, or 12, the (meth)acrylate monomer (B) is a bifunctional monomer represented by the general formula (2), (2)

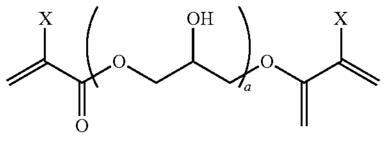

wherein X represents H or a methyl group, and a=1 to 5, the (meth)acrylate monomer (C) is a monofunctional monomer represented by the general formula (3), (3)

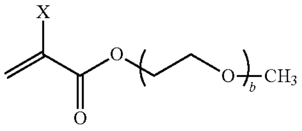

wherein X represents H or a methyl group, and b=4 to 15, the (meth)acrylate monomer (D) is a monofunctional monomer represented by the general formula (4), (4)

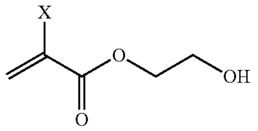

wherein X represents H or a methyl group, the moisture absorption film has a water absorption rate of 10 w % or more and 30 w % or less, and the moisture absorption film has a haze changing value ΔH before and after a Taber abrasion test of 4 or less.

2. The moisture absorption film layered product according to claim 1, wherein the moisture absorption film contains an ultraviolet ray absorbent and/or a light stabilizer.

3. The moisture absorption film layered product according to claim 1, wherein the moisture absorption film layered product is used as a window member for a vehicle.

4. A method of manufacturing the moisture absorption film layered product according to claim 1, the method comprising:

applying the photocurable composition on the substrate; and irradiating the applied photocurable composition with active energy ray for curing the photocurable composition to form the moisture absorption film.

5. The method of manufacturing the moisture absorption film layered product according to claim 4, wherein, in curing the photocurable composition to form the moisture absorption film, irradiation conditions of the active energy ray is light within a wavelength region of 200 nm or longer and 400 nm or shorter, an illuminance of 200 to 900 mW/cm2, and an integrated light quantity of 1000 to 8000 mJ/cm2.

* * * * *